Dec. 24, 1963     E. L. RAPPLEAN ETAL     3,115,114
FUEL DELIVERY SYSTEM INCLUDING AN ANTI-SIPHONING FEATURE
Filed Feb. 7, 1962
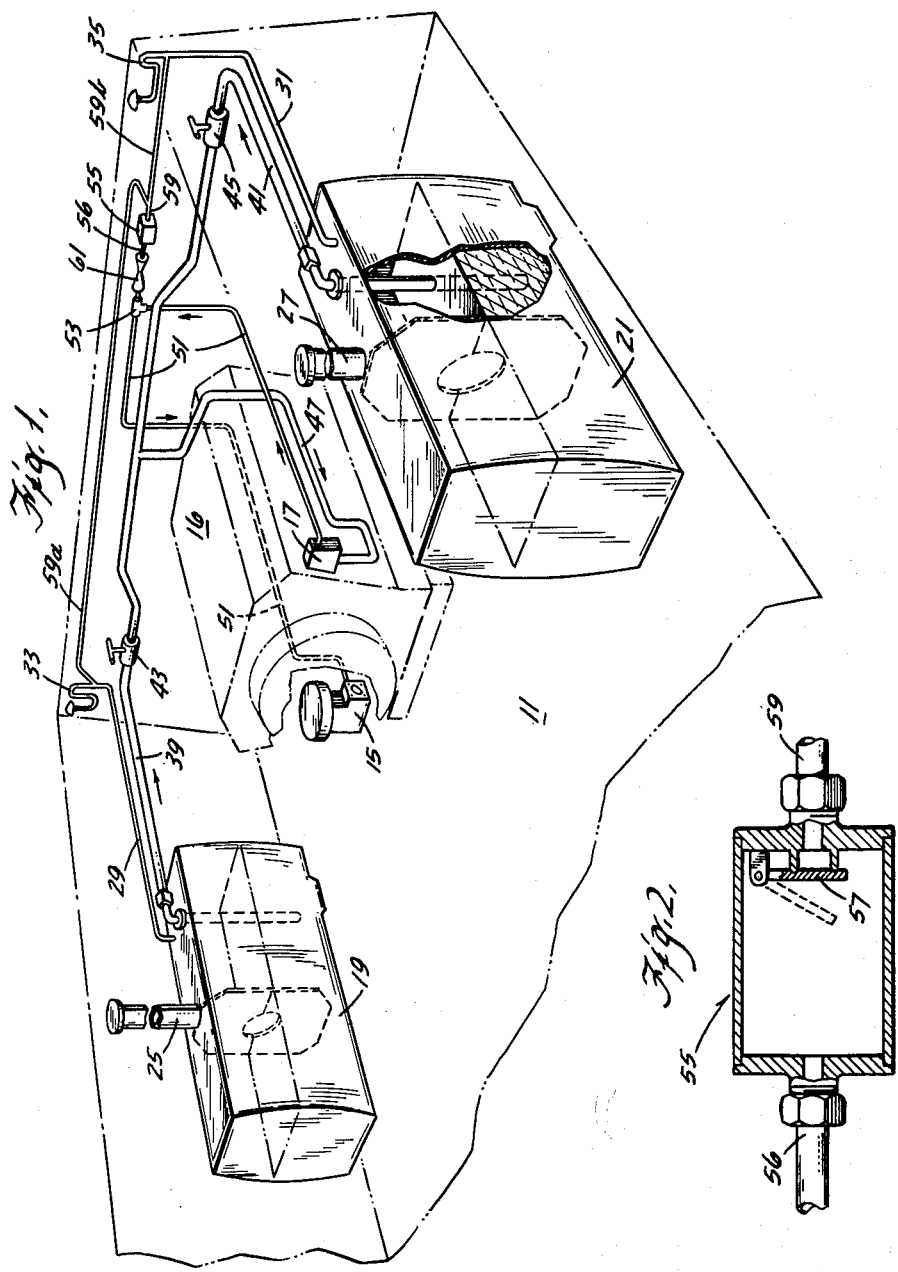
INVENTORS.
EUGENE L. RAPPLEAN
CHESTER DU BOIS
BY
Wheeler, Wheeler & Wheeler
ATTORNEYS.

United States Patent Office 3,115,114
Patented Dec. 24, 1963

3,115,114
FUEL DELIVERY SYSTEM INCLUDING AN ANTI-SIPHONING FEATURE
Eugene L. Rapplean, Libertyville, and Chester Du Bois, Zion, Ill., assignors to Outboard Marine Corporation, Waukegan, Ill., a corporation of Delaware
Filed Feb. 7, 1962, Ser. No. 171,761
7 Claims. (Cl. 115—.5)

The disclosed invention relates to fuel delivery systems for boat-mounted internal combustion engines. More particularly, the invention relates to an anti-siphoning arrangement preventing siphoning of the flammable fuel in a fuel tank to the bilge of a boat as a result of a leak in the fuel supply system, and particularly as a result of a leaking float valve in the carburetor.

Still more particularly, when the carburetor associated with an engine is connected by a closed conduit to an associated fuel storage tank and when the level of the fuel in the storage tank is above the carburetor, any leak in the carburetor, or its connections, as for example, in the float valve, can result in siphoning of the fuel from the storage tank with resultant accumulation in the bilge. Such a condition is not only wasteful, but intolerable because of the danger of fire and explosion.

The disclosed invention provides an anti-siphoning system including means openable to the atmosphere to control the entry of air into the piping between the fuel pump and the carburetor, i.e., to prevent entry of air when the pump is in operation and to permit entry of air when the pump is not operating, thereby preventing siphoning action when the engine is shut down.

The invention also provides an arrangement whereby any fuel which may pass through the air entry controlling means, during operation of the fuel pump, is returned to the fuel storage tank through the fuel tank vent lines.

The construction further contemplates, in combination with an anti-siphoning system, a dual tank fuel storage system which facilitates withdrawal of the fuel from the more heavily ladened tank, whereby the fuel pump acts to supply fuel to the engine in such manner as to effect equalization of the fuel level in the separate tanks. This result is generally obtained by symmetrically designing the fuel storage system.

Other objects and advantages of the invention will become known by reference to the following description and the accompanying drawings of one embodiment of the invention.

In the drawings:
FIGURE 1 is a partially diagrammatic perspective view of a fuel storage and supply system incorporating various of the features of the invention, and
FIGURE 2 is an enlarged view, partially in section, of the check valve incorporated in the system shown in FIGURE 1.

The disclosed fuel storage and supply system is shown installed in the hull 11 of a boat and generally includes an engine 16 which is supplied with a fuel mixture by a carburetor 15. Fuel is supplied to the carburetor by a fuel pump 17 and from a pair of separate fuel storage tanks 19 and 21. The separate fuel storage tanks 19 and 21 each include respective capped supply ports 25 and 27 and respective vent lines 29 and 31 which are open to the atmosphere at their ends and incorporate respective goosenecks 33 and 35 to prevent entry of water through the vent lines into the tanks. The construction thus far described is well known.

The dual fuel tank installation is designed so that the fuel level in the tanks will become equalized by initial draining of the more heavily laden tank and so that after equalization of the fuel level in the tanks, both tanks will be emptied simultaneously. The result is obtained by employing tanks which are generally identical and are symmetrically mounted at a maximum distance from the fore and aft center line in the same general area, only on opposite sides of the boat, and by connecting the fuel tanks 19 and 21 to the fuel pump 17 through a pair of generally identical, symmetrical branch supply lines or conduits 39 and 41 which respectively include hand valves 43 and 45 and empty into a common supply line or conduit 47. As a result, resistance to flow through each of the branch supply lines 39 and 41 is generally identical. Thus, the tank arrangement, coupled with the action of the fuel pump, co-operate to assist in obtaining and maintaining the boat in proper trim. In addition, the symmetric arrangement of tanks at maximum distance from the center line of the boat also provides, when the tanks are equally laden, a stabilizing effect serving to minimize roll.

From the fuel pump 17, the fuel is delivered through piping 51 to the carburetor 15 which, because of the engine mounting adjacent the bottom of the boat hull, is located generally below the fuel tanks. Accordingly, should a leak develop in the carburetor 15, all the fuel in the fuel storage tanks 19 and 21 above the level of the leak would be subject to siphoning and would be discharged into the bilge of the boat.

In the disclosed construction, entry of air into the piping 51 is permitted to prevent siphoning when the fuel pump 17 is not operating, and is excluded when the fuel pump is operating. This is accomplished by air-entry control means in the form of a portion of said piping disposed above the top of the fuel tanks and a check valve 55 which is located in a branch conduit or line 56 connected to said portion of the piping 51 by a T fitting 53. The check valve 55 opens to connect the piping 51 to the atmosphere in the absence of a positive pressure on the side thereof leading to the piping 51.

The check valve 55 can take various forms. In the disclosed construction, the valve includes a disk or valve member 57 which is hingedly supported and lightly biased by gravity against the end of a portion 59 of the branch conduit 56 leading to the atmosphere. Accordingly, whenever there is any positive pressure in the branch conduit 56 by reason of operation of the fuel pump 17, the valve member 57 will remain in its closed position, barring the entry of air through the branch conduit 56 into the piping 51. However, if the carburetor should leak when the engine 16 is shut off and the fuel pump 17 is accordingly not in operation, the resulting decreased pressure in the piping 51 permits opening of the valve member 57 relative to the branch conduit portion 59 to afford entry of air into the piping 51, thereby stopping any siphoning action.

In order that the head of fuel in the storage tanks 19 and 21 will not provide a positive pressure in the branch conduit 56, thereby maintaining the check valve in closed position, said portion of said piping adjacent to the T 53 and the check valve 55 are located above the top of the fuel storage tanks 19 and 21.

The disclosed construction also provides against loss of fuel if, for one reason or another, the valve member 57 does not seat tightly against the end of the branch conduit portion 59 when the fuel pump is running. In this regard, the branch conduit portion 59 is respectively connected to the fuel storage tanks 19 and 21 through the vent lines 29 and 31 by conduit extensions 59a and 59b. As a result, fuel pumped through the check valve 55 will find its way back to the tanks and will not be discharged overboard.

Control of the maximum amount of fuel which can be passed through the check valve 55 into the vent lines can be obtained by use of a restriction 61, without adversely effecting passage of air to the system when the fuel pump 17 is shut down. If extra fuel pump capacity is available, the check valve 51 can be omitted, and passage of fuel through the restriction can be employed to prevent air flow into the piping 51 leading to the carburetor 15 when the fuel pump is operating.

Various of the features of the invention are set forth in the following claims.

What is claimed is:

1. A fuel system for an internal combustion engine including a fuel tank, a fuel pump, a first conduit connecting said fuel tank and said fuel pump, a carburetor located at a point below the top of said fuel tank, a second conduit connecting said carburetor and said fuel pump, and including a portion disposed above the top of said fuel tank, and air entry controlling means connected with said portion of said second conduit above the top of said fuel tank for preventing entry of air into said second conduit during operation of said fuel pump and for permitting the entry of air into said second conduit when said fuel pump is not operating.

2. A fuel system as set forth in claim 1 in which said air-entry controlling means comprises a check valve operable to permit entry of air into said second conduit in the absence of pressure above atmospheric in said portion of the second conduit.

3. A fuel system as set forth in claim 2 wherein a branch conduit connects said air-entry controlling means with said portion of said second conduit and said fuel tank includes a vent line open to the atmosphere and in communication with said check valve.

4. A fuel system as set forth in claim 3 including flow restriction means between said check valve and said second conduit.

5. The improvement set forth in claim 1 wherein said fuel tank includes a vent line open to the atmosphere and wherein a branch conduit connects said air-entry controlling means with said portion of said second conduit and communicates with said vent line, and wherein said air-entry controlling means comprises a restriction in said branch conduit, whereby fuel is passed through said restriction by operation of said fuel pump to prevent entry of air into said second conduit, and whereby the fuel passed through said restriction returns to said fuel tank through said vent line.

6. The combination of a boat, an internal combustion engine mounted on said boat, a fuel tank on said boat, a fuel pump on said boat, a first conduit connecting said fuel tank and said fuel pump, a carburetor mounted on said engine at a point below the top of said fuel tank, a second conduit connecting said carburetor and said fuel pump and including a portion disposed above the top of said fuel tank, a branch conduit extending from said portion of said second conduit above the top of said fuel tank and communicating with the atmosphere, and air-entry controlling means in said branch conduit for preventing the entry of air into said second conduit during operation of said fuel pump and for permitting the entry of air into said second conduit when said fuel pump is not operating.

7. The combination set forth in claim 6 including a second fuel tank, said fuel tanks being generally identical, being mounted on opposite sides of said boat in generally corresponding positions, and each including a vent line open to the atmosphere, said first conduit including a pair of branch lines respectively connected to said fuel tanks, said branch lines having approximately equal resistance to flow, and wherein said branch conduit includes a common portion in which said air-entry controlling means is disposed and extensions connected to the respective vent lines leading from said fuel tanks.

References Cited in the file of this patent
UNITED STATES PATENTS
2,795,269  Witte _____ June 11, 1957

UNITED STATES PATENT OFFICE
CERTIFICATE OF CORRECTION

Patent No. 3,115,114                                        December 24, 1963

Eugene L. Rapplean et al.

It is hereby certified that error appears in the above numbered patent requiring correction and that the said Letters Patent should read as corrected below.

Column 3, line 31, for "The improvement" read -- A fuel system as --.

Signed and sealed this 26th day of May 1964.

(SEAL)
Attest:

ERNEST W. SWIDER                                   EDWARD J. BRENNER
Attesting Officer                                         Commissioner of Patents